United States Patent
Woong et al.

(10) Patent No.: US 7,078,476 B2
(45) Date of Patent: Jul. 18, 2006

(54) COPOLYESTER RESIN FOR SOLVENTBORNE COATING AND COATING COMPOSITION COMPRISING THE SAME

(75) Inventors: Lee Tae Woong, Suwon-si (KR); Kim Soon Ki, Suwon-si (KR)

(73) Assignee: SK Chemicals Co., Ltd., Seoul (KR)

( * ) Notice: Subject to any disclaimer, the term of this patent is extended or adjusted under 35 U.S.C. 154(b) by 0 days.

(21) Appl. No.: 10/493,410

(22) PCT Filed: Oct. 18, 2002

(86) PCT No.: PCT/EP02/11655

§ 371 (c)(1),
(2), (4) Date: Apr. 22, 2004

(87) PCT Pub. No.: WO03/035715

PCT Pub. Date: May 1, 2003

(65) Prior Publication Data

US 2004/0241471 A1  Dec. 2, 2004

(30) Foreign Application Priority Data

Oct. 22, 2001 (EP) .................................. 01125091

(51) Int. Cl.
*C08G 63/00* (2006.01)

(52) U.S. Cl. ................... 528/272; 424/423; 424/424.2; 428/411.1; 428/412; 428/480; 428/500; 528/271

(58) Field of Classification Search ................ 424/423, 424/424.2; 428/411.1, 412, 480, 500; 528/271, 528/272
See application file for complete search history.

(56) References Cited

U.S. PATENT DOCUMENTS

| 4,535,132 A | 8/1985 | Ambrose et al. |
| 5,349,010 A * | 9/1994 | Kuo ........................ 524/600 |
| 5,620,801 A | 4/1997 | Binns et al. |

FOREIGN PATENT DOCUMENTS

WO  WO 99/60067  11/1999

OTHER PUBLICATIONS

Johnson, L.K., "New Monomers for Polyester Powder Coating Resins, " JCT Journal of Coatings Technology (Philadelphia, PA), vol. 65, No. 826, Nov. 1, 1993, pp. 1,6,19-26.

* cited by examiner

*Primary Examiner*—Terressa Boykin
(74) *Attorney, Agent, or Firm*—Finnegan, Henderson, Farabow, Garrett & Dunner, LLP

(57) ABSTRACT

Disclosed is a copolyester resin having number average molecular weight over 5,000 for solventborne metal coating binder, which has superior gloss retention and color stability after long term outdoor exposure, and a coating composition comprising the same. The copolyester has excellent weatherability and color stability. The copolyester resin is prepared through the polycondensation of an acid component comprising 60–90 mol % of aromatic dicarboxylic acid selected from the group consisting of isophthalic acid, C1–C2 alkylester of isophthalic acid, phthalic acid, C1–C2 alkylester of phthalic acid, phthalic anhydride, and mixtures thereof, and 10–40 mol % of cycloaliphatic dicarboxylic acid selected from the group consisting of 1,2-cyclohexane dicarboxylic anhydride, 1,2-cyclohexane dicarboxylic acid, C1–C2 alkylester of 1,2-cyclohexane dicarboxylic acid, 1,4-cyclohexane dicarboxylic acid, C1–C2 alkylester of 1,4-cyclohexane dicarboxylic acid, and mixtures thereof, an alcohol component comprising 60–100 mol % of 2,2-dialkyl-1,3-propandiol and 0–40 mol % of a polyvalent alcohol and 0–5 mol % of a polyvalent alcohol or acid.

10 Claims, No Drawings

COPOLYESTER RESIN FOR SOLVENTBORNE COATING AND COATING COMPOSITION COMPRISING THE SAME

The present invention relates, in general, to a copolyester resin for coating and, more particularly, to copolyester resin that is of superior stability against UV light and hydrolysis. This resin can be useful as a binder for an outdoor-durable top-coating paint for exterior finish materials by virtue of its high weatherability and coat hardness.

Of coating compositions for exterior finish materials, an outdoor-durable top-coating paint is required to be superior in weatherability because it is exposed to UV light and rain for a long period of time. Such exposure causes the binder resin of the paint to be degraded, so that the paint coat becomes dull in gloss and discolored in a short term. In addition, the paint coat undergoes chalking and is degraded or cracked with the passage of a long period of time. In most cases, thus, the exterior finish materials need repainting regularly.

In order to prevent such coating aging, the binder resin used must have excellent anti-UV degradability (resistance to UV degradation) as well as anti-hydrolysis.

Widely used at recent are alkyd resin and vinyl resin. The paints using these resins as binders show good mechanical properties, such as hardness. However, the alkyd resin paint and vinyl resin paint are greatly insufficient of weatherability and poor in processability, so that they have many limitations and much difficulty in practical application.

At present, much attention is paid to silicon alkyd based resins and fluorine resins as binders for exterior finish materials, such as steel plates. Besides being very poor in processability, silicon alkyd based polyester resins suffer from a significant problem in that silicon powders blow upon painting to cause cratering. Thus, it is difficult to work with the silicon alkyd based polyester resins. In addition, they are found to do not greatly improve in weatherability. Fluorine resin paints are far superior in weatherability, but show low hardness on account of their chemical structures in addition to being poor in processability. What is worse, they are very expensive. So, they are limited in use.

For these reasons, many attempts have been made to provide high weatherability for pure polyester resins. To date, however, only a little improvement has been brought about in weatherability of pure polyester resins, and their processability does not come up to a desired level owing to their highly branched structures. For instance, U.S. Pat. No. 5,620,801 describes a copolyester for solvent based coating material which attempt providing UV stability, but this material shows bad processability because it has not only lower level of molecular weight but also high branched structure using preferably 5 to 15 mole % of trifunctional monomer, calculated on hydroxy or acid compounds. U.S. Pat. No. 5,376,460 also describes a solventborne copolyester comprised of over 50 mo % of cycloaliphatic acid component for outdoor durable coating, but the coatings obtained according to this patent have lower hardness and bad hydrolysis resistance caused from its lower contents of aromatic materials.

With the background in mind, the present invention has an object of providing copolyester resin compositions for coating, which are superb in weatherability as well as show excellent paint film hardness and press processability.

Knowledge of the structural characteristics of copolyester allows modification and adaptation leading to this invention. As a result of the intensive and thorough research on a copolyester-based coating composition, repeated by the present inventors, it was found that, together with a completely saturated cycloaliphatic dicarboxylic acid, a combination of 2,2-dialkyl-1,3-propanediol, free of beta-hydrogen, containing 5–9 carbon atoms, aromatic dicarboxylic acid, and cycloaliphatic glycol can be synthesized into a copolyester resin which is of superior stability against UV light and hydrolysis. When being formulated with components for a coating composition, this resin was also found to provide the coating composition with the necessary hardness, gloss and anti-photolysis for top-coating paints. In addition, the copolyester resin can be polymerized to a sufficient molecular weight to show high press processability.

In an aspect of the present invention, there is provided a copolyester resin, prepared by polycondensing the following components:

(a) an acid component comprising 60–90 mol % of aromatic dicarboxylic acid selected from the group consisting of isophthalic acid, C1–C2 alkylester of isophthalic acid, phthalic acid, C1–C2 alkylester of phthalic acid, phthalic anhydride, and mixtures thereof, and 10–40 mol % of cycloaliphatic carboxylic acid selected from the group consisting of 1,2-cyclohexane dicarboxylic acid, C1–C2 alkylester of 1,2-cyclohexane dicarboxylic acid, 1,2-cyclohexane dicarboxylic anhydride, 1,4-cyclohexane dicarboxylic acid, C1–C2 alkylester of 1,4-cyclohexane dicarboxylic acid, and mixtures thereof; and (b) an alcohol component comprising 60–100 mol % of 2,2-dialkyl-1,3-propanediol represented by the following general formula:

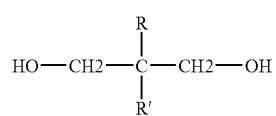

wherein R and R', each is a C1–C4 alkyl group, and 0–40 mol % of a polyvalent alcohol; and (c) a polyfunctional component having functionality three or higher in an amount of at most 5 mol % based on the total moles of acid and alcohol components, said polyfunctional component comprising polyacid and/or polyol.

In another embodiment, in the compound of chemical formula I, R and R' each is a C2–C4 alkyl group and this compound is present in an amount of 10–55 mol %.

In another embodiment, the copolyester has an intrinsic viscosity of 0.2 dl/g or greater and ranges, in number average molecular weight, from 5,000 to 20,000.

In another aspect of the present invention, there is provided a solventborne coating composition comprising such a polyester resin.

The gloss dullness and chalking phenomenon of polyester coatings, which both appear with aging of the coatings, are known to be attributed to the occurrence of photodegradation (particularly, UV degradation) and hydrolysis in the resin component of coating constituents. The UV degradation is performed in two ways: direct degradation in which UV light itself participates, and photooxidation. Generally, the photodegradation of aliphatic materials is progressed in the former manner while the latter is a main mechanism of the photodegradation of aromatic materials.

To avoid using aromatic materials, which are of large UV absorptivity, is a means of restraining UV photodegradation. However, the absence of aromatic materials renders coating compositions too low in glass transition temperature (Tg) and causes moistures to diffusely transfer in the coating compositions, deteriorating the stability against hydrolysis. Hence, it is necessary to use aromatic materials, but they are required to have molecular structures that are of so low fluidity that oxygen diffusion does not easily take place, thereby restraining oxidation, a main photodegradation mechanism of aromatic materials.

Since aliphatic materials are degraded in a Norrish-II type mechanism by light, it is recommended that the coating compositions contain as little beta-hydrogen as possible.

Also, the presence of a side chain at specific positions of the binder resin makes it difficult for moistures to access ester linkages, assuring the coating composition of stability against hydrolysis. These specific positions that allow the minimization of hydrolysis are suggested as the "Rule of six" of Newman.

To these ends, a completely saturated cycloaliphatic dicarboxylic acid, or its alkylester or anhydride derivative, is employed as a polyvalent acidic component in preparing copolyester resins of the present invention. Also, the copolyester resins comprise an aromatic dicarboxylic acid, or its alkyl ester or anhydride derivative as another polyvalent acidic component. Used as a necessary component, this aromatic dicarboxylic acid is structurally so low in fluidity as to prevent oxygen and moisture diffusing, thereby providing the hardness and gloss to a level suitable for top-coating paints.

As for the polyvalent alcohol component for the polyester resin, it comprises alkylene glycol of chemical formula I, free of beta-hydrogen and a cycloaliphatic glycol. The alkylene glycol gives a great contribution to an improvement in UV stability and hydrolysis resistance while the cycloaliphatic glycol acts to prevent the lowering of the glass transition temperature of the composition and the hardness of the paint coating in addition to restraining UV absorption.

In accordance with the present invention, these component materials are polymerized to high molecular weight polyesters, which are greater than a specific molecular weight, with the aim of providing flexibility upon press processing.

When the content of cycloaliphatic dicarboxylic acid in the acidic component is greater than 40 mol %, the resin is too low in glass transition temperature to secure appropriate hardness. On the other hand, when the acidic component contains the aromatic dicarboxylic acid at an amount of more than 90 mol %, the coating materials show not only very poor in flexibility but high viscous behavior which is not desirable in paint.

In the alcohol component, 2,2-dialkyl-1,3-propanediol of chemical formula I is contained at an amount of 60–100 mol %. For example, if this compound is used at an amount of less than 60 mol %, a significant deterioration is brought about in the fluidity and hydrolysis resistance of the resin. Particularly, a mixture of neopentylglycol and 2-butyl-2-ethyl-1,3-propanediol can be used as the 2,2-dialkyl-1,3-propanediol of chemical formula I. In this case, the 2-butyl-2-ethyl-1,3-propanediol is present in the mixture in an amount of 10–55 mol % of the total amount of the alcohol component. More preferably, a mixture of neopentylglycol and 2-butyl-2-ethyl-1,3-propanediol is used in an amount of 80–100 mol % of the total alcohol component, the 2-butyl-2-ethyl-1,3-propanediol being present in an amount of 20–55 mol % of the total alcohol component. In this case, a more preferable effect is obtained in terms of hydrolysis resistance.

Also, there may be used a polyvalent alcohol which is selected from the group consisting of cyclohexanedimethanol, ethylene glycol, propylene glycol, butanediol, 1,6-hexanediol, trimethylpentanediol, tricyclodecanedimethanol, and mixtures thereof. Particularly, cyclohexanedimethanol is used at an amount of 0–40 mol % and more particularly 20–30 mol % based on the moles of the total alcohol component. For instance, when cyclohexanedimethanol is present at an amount larger than 40 mol % in the alcohol component, the paint composition shows such poor solubility in solvents and low fluidity and coating smoothness that it cannot be used as a top-coating paint. 1,2-cyclohexanedimethanol, 1,3-cyclohexanedimethanol and 1,4-cyclohexanedimethanol, which may be used alone or in combination, exemplify useful cyclohexanedimethanol.

If the polyvalent alcohol is selected from the group consisting of ethylene glycol, butanediol, 1,6-hexanediol and mixtures thereof, it comprises at most 20 mol % of the total alcohol component.

When polyfunctional component (c) having functionality three or higher is used for enhancing the reactivity of crosslinking and/or crosslinking density by introducing branch structure into polyester, it should be restricted at an amount of at most 5 mol % and more particularly 0–2.5 mol % based on the total moles of acid and alcohol components for the good press processability. Those which have polyfunctional component having functionality three or higher may be selected from the group consisting of trimethylolpropane, trimellitic acid or trimellitic anhydride and mixture thereof.

To be of excellent press processability, the copolyester of the present invention should have an intrinsic viscosity of 0.2 dl/g or more preferably 0.20–0.40 dl/g, a number average molecular weight of 5,000–20,000 and more preferably 6,000–12,000, an acid number of 0–3 mg KOH/g and an hydroxyl number of 20–50 mg KOH/g. A copolyester resin with a number average molecular weight of less than 5,000 has an increased, crosslink density, showing degraded press processability. On the other hand, when the number average molecular weight is over 20,000, the resin shows a low hardness with a decrease of crosslink density. In this case, its solution viscosity is also elevated, thereby lowering the painting workability and making difficult the solidification of the paint coat to a high degree.

Non-limitative, illustrative examples of the esterification catalysts useful in preparing the resin of the present invention include acetates of Ca, Ce, Pb, Mn, Zn, Mg, and Sb, and tetrabutoxy titan. In the present invention, polycondensation may be conducted in the presence of Sb2O3 or GeO2. For the polycondensation, a phosphorus oxide may be usefully added as a thermal stabilizer.

The copolyester resin of the present invention may be prepared in an ordinary method. For example, a mixture of the acidic component and the polyvalent alcohol component is gradually heated from room temperature to about 200–260° C. in the presence of an esterification catalyst When by-products, such as water and methanol, are formed, the esters are added with a polycondensation catalyst and a thermal stabilizer and reacted in a vacuum condition. At an elevated temperature of 260–280° C., the reactant is subjected to copolymerization for several hours to give copolyesters that have an intrinsic viscosity of 0.20–0.40 dl/g and a number average molecular weight of 6,000–12,000.

The copolyester resins according to the present invention are particularly useful for coating compositions, such as paints. For instance, coating compositions formulated from the copolyester resins show excellent hardness, press processability and paint workability with superiority in weatherability, so they can be usefully applied for top-coating paints for steel plates. Typically, a polyester-based coating composition comprises a solvent. It is possible to choose 1~3 species according to the each application or process condition in a ratio of the main solvent to the co-solvent of 20~50/80~50. The main solvent may be selected from cyclohexanone, dibasic esters, cellosolve acetate, butyl glycol, etc. The co-solvent may be choosen from Solvesso #100 or Solvesso #150. The composition contains also a curing agent, a hardening agent, an anti-foaming agent, a wetting agent (for example Nusperse 657(Tenneco) or BYK P104 (BYK) or ASP-200 (Engelhard) or DISPARLON 2150 (KUSUMOTO, JAPAN) and/or other customary ordinary additives such as flowing and leveling agents (for example are 0.5% by total paint weight of Poly flow-S (KYOEISHA) or DISPARLON LC Series (KUSUMOTO) or URAD DD27 (DSM,Holland).

As for the curing agent, it is exemplified by a polyvalent isocyanate curing agent, a thermal curing agent such as aminoformaldehyde or a urea resin. The ratio of crosslinker to copolyester varies from 1/4 to 1/9 in weight.

A better understanding of the present invention may be obtained in light of the following examples that are set forth to illustrate, but are not to be construed to limit the present invention. In the following examples, physical and chemical properties were measured as follows:

Intrinsic Viscosity: measured at 35° C. in an orthochlorophenol solvent by a Cannon-Ubbelodhe type viscometer.

Glass transition temperature: measured in a differential scanning calorimetry (DSC) method.

Number Average Molecular Weight: solutions of copolyester resins in tetrahydrofuran were subjected to gel permeation gas chromatography (WATERS GPC 150-CV) with polystyrene (Shodex SM-105' from Showa Denko, Japan) serving as a control.

Solvent Resistance: a Zn-plated steel plate 0.5 mm thick, which was coated with a paint and dried at 270° C. for 50 sec with the aid of a hot air dryer, was rubbed with a methylethylketone (MEK)-soaked gauze which was wrapped around a finger. When the rubbing was conducted in such a manner that the gauze shuttled a distance of 10 cm on the plate, the solvent resistance was evaluated as the amount of the shuttling until the paint coat was marred.

60° Gloss: when a beam was incident on a Zn-plated steel plate 0.5 mm thick, which was coated with a paint and dried at 270° C. for 50 sec with the aid of a hot air dryer, a reflectance at 60° from the plate was measured by micro-tri Gloss meter, commercially available from BYK-Gardener.

Accelerated Weatherability: a Zn-plated steel plate 0.5 mm thick, which was coated with a paint and dried at 270° C. for 50 sec with the aid of a hot air dryer, was allowed to stand for 7,000 hours in a QUV accelerated weathering tester, commercially available from Q-Panel, and its gloss retention percent was measured in comparison with the initial gloss. In the tester, the plate samples were allowed to repetitively undergo a testing cycle, which was composed of condensation for 4 hours at 50° C., and QUV-A (340 nm) irradiation for 8 hours at 60° C.

Pencil Hardness: a Zn-plated steel plate 0.5 mm thick, which was coated with a paint and dried at 270° C. for 50 sec with the aid of a hot air dryer, was measured for coat hardness by use of a pencil for measuring coat hardness, commercially available from Mitsubishi, Japan.

Flexibility: a Zn-plated steel plate 0.5 mm thick, which was coated with a paint and dried at 270° C. for 50 sec with the aid of a hot air dryer, was so completely bent as for bent plate halves to form an angle of zero degree while plates with the same thickness were inserted between the bent halves. When no coat cracks were observed with a magnifying lens at a magnification of 30 times, the flexibility of the coat paint was expressed as the number of the plates inserted.

A. Preparation of Copolyester

EXAMPLES I TO VI

In a 500 ml three-necked flask equipped with a thermometer, a condenser, a mantle and a stirrer and connected to a vacuum pump, acid components and alcohol components were placed according to the indication of Table 1, below. After being added with esterification catalysts, Zn acetate and tetrabutoxy titan, the components were gradually heated from room temperature to 250° C. When the by-product water or methanol was discharged to a theoretical amount, the polycondensation catalyst Sb2O3 and the thermal stabilizer trimethyl phosphate were fed, after which the reactants were reacted at 265° C. for several hours in a vacuum condition to give copolymers ranging, in intrinsic viscosity, from 0.20 to 0.40 dl/g with a number average molecular weight of 6,000–12,000. The copolymers were measured for physical properties and the results are given in Table 1, below.

COMPARATIVE EXAMPLES I,II, III and IV

The same procedure as in Example I was repeated, except that acid and alcohol components were added as indicated in Table 1, below. The properties of the copolyesters obtained are given in Table 1.

TABLE 1 unit: wt (g)

| Compositions & Properties | | Example | | | | | | Comp. Examples | | | |
|---|---|---|---|---|---|---|---|---|---|---|---|
| | | I | II | III | IV | V | VI | I | II | III | IV |
| Acid Component(a) | 1,2-cyclohexane dicarboxylic acid | 123.4 | 61.7 | 123.4 | 123.4 | 30.8 | 123.4 | 154.2 | 0.0 | 154.2 | 0.0 |
| | 1,4-cyclohexane dicarboxylic acid | 0.0 | 0.0 | 0.0 | 0.0 | 103.3 | 0.0 | 0.0 | 0.0 | 103.3 | 0.0 |
| | Isophthalic Acid | 199.4 | 265.8 | 199.4 | 199.4 | 199.4 | 199.4 | 0.0 | 166.1 | 66.5 | 332.3 |
| | Terephthalic Acid | 0.0 | 0.0 | 0.0 | 0.0 | 0.0 | 0.0 | 166.1 | 166.1 | 0.0 | 0.0 |

TABLE 1-continued unit: wt (g)

| Compositions & Properties | | Example | | | | | | Comp. Examples | | | |
|---|---|---|---|---|---|---|---|---|---|---|---|
| | | I | II | III | IV | V | VI | I | II | III | IV |
| Alcohol Component (b) | Ethylene Glycol | 37.2 | 37.2 | 37.2 | 37.2 | 37.2 | 9.3 | 41.0 | 41.0 | 31.1 | 37.2 |
| | 2,2-Dimethyl-1,3-Propanediol | 171.8 | 171.8 | 161.2 | 171.8 | 156.2 | 148.4 | 165.6 | 165.6 | 156.2 | 171.8 |
| | 2-Butyl-2-ethyl-1,3-propanediol | 120.2 | 120.2 | 112.5 | 0.0 | 96.2 | 228.4 | 0.0 | 0.0 | 80.3 | 120.2 |
| | Cyclohexane dimethanol | 0.0 | 0.0 | 0.0 | 108.2 | 0.0 | 0.0 | 0.0 | 0.0 | 0.0 | 0.0 |
| | 1,6-Hexanediol | 0.0 | 0.0 | 0.0 | 0.0 | 35.5 | 0.0 | 70.9 | 70.9 | 59.2 | 0.0 |
| | Trimethylol Propane | 0.0 | 0.0 | 20.1 | 0.0 | 0.0 | 0.0 | 20.1 | 20.1 | 0.0 | 0.0 |
| Properties | Intrinsic Viscosity | 0.239 | 0.353 | 0.345 | 0.302 | 0.294 | 0.312 | 0.290 | 0.311 | 0.303 | 0.339 |
| | Tg (EC) | 42.3 | 46.8 | 40.2 | 47.2 | 29.0 | 41.5 | 22.9 | 30.9 | 13.9 | 53.7 |
| | Number Average Mw | 7473 | 10350 | 7061 | 8874 | 9600 | 9430 | 7000 | 6700 | 9500 | 10590 |

B. Preparation of Paints

To assay the performance of the present invention, each of the copolyester synthesized in Examples I to VI and Comparative Examples I to IV was dissolved in a mix solvent of cyclohexanone/Solvesso #100/Solvesso #150 (40/30/30) to give a solution with a solid content of 50 wt % which was, then, formulated into a dispersion phase according to the indication of Table 2. This dispersion phase was mixed as in Table 3, to allow paint.

TABLE 2

| Dispersion Formulation Phase | |
|---|---|
| TiO2 (Rutile type KRONOS-2160) | 100 g |
| 50% resin solution DBE/Solvesso 100 = (1/1) mix solvent | 100 g |
| | 50 g |
| Wetting Agent: Modaflow** | 0.01 g |

**Available from Monsanto, U.S.A

TABLE 3

| Solution Formulation Phase | |
|---|---|
| Dispersion Formulation (made with Table 2) | 250 g |
| 50% resin solution* | 71.4 g |
| Cymel 303** | 14.3 g |
| n-butanol | 8.1 g |
| Dinonynalenesulfonylacetate 50% Sol'n in cellosove acetate | 4.0 g |

*Solvent system: cyclohexanone/Solvesso #100/Solvesso #150 (40/30/30)
**Melamine formaldehyde cross-linker available from Cyanamid U.S.A.

C. Physical Properties of Coats

The paints thus obtained were coated on steel plates and the coats were measured for physical and chemical properties. The results are given in Table 4, below.

TABLE 4

| Coat Properties | Example | | | | | | Comp. example | | | |
|---|---|---|---|---|---|---|---|---|---|---|
| | I | II | III | IV | V | VI | I | II | III | IV |
| Solvent Resistance (Rounds) | | over 50 | | | 49 | 41 | | over 50 | 46 | 50 |
| 60° Gloss (%) | 89 | 91 | 87 | 91 | 88 | 90 | 71 | 85 | 88 | 86 |
| Accelerated Weatherability (Gloss Retention %) | 79 | 87 | 81 | 76 | 62 | 88 | 11 | 16 | 70 | 86 |
| Pencil Hardness | H | H | 2 H | H+ | F | F | H | H | HB | 2 H |
| Flexibility (T-BEND) | 0 T | 1 T | 2 T | 1 T | 0 T | 0 T | 0 T | 0 T | 0 T | 4 T |
| Paint vis. (Ford cup 4, sec) | 129 | 139 | 136 | 143 | 124 | 119 | 122 | 115 | 121 | 196 |

As apparent from the data of the above examples and comparative examples, the copolyester resins prepared according to the present invention are superior in resistance to UV light and hydrolysis and useful as binders for coating compositions which are used where weatherability is required. Also, the binders provide the coat compositions with assurance of processability, coat gloss, fluidity, and workability, so that the coating compositions are very useful as outdoor-durable top-coating paints for exterior finish materials, such as steel plates.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A copolyester resin for solventborne coating composition, said copolyester resin prepared by polycondensing components consisting essentially of:
    (a) an acid component comprising
        60–90 mol % of aromatic dicarboxylic acid selected from the group consisting of isophthalic acid, C1–C2 alkylester of isophthalic acid, phthalic acid, C1–C2 alkylester of phthalic acid, phthalic anhydride, and mixtures thereof, and
        10–40 mol % of cycloaliphatic dicarboxylic acid selected from the group consisting of 1,2-cyclohexane dicarboxylic anhydride, 1,2-cyclohexane dicarboxylic acid, C1–C2 alkylester of 1,2-cyclohexane dicarboxylic acid, 1,4-cyclohexane dicarboxylic acid, C1–C2 alkylester of 1,4-cyclohexane dicarboxylic acid, and mixtures thereof;
    (b) an alcohol component comprising polyvalent alcohol present in an amount of 40% or less, and 60–100 mol % of 2,2-dialkyl-1,3-propanediol wherein
        said polyvalent alcohol is selected from the group consisting of cyclohexanedimethanol, propylene glycol, 2,2,4-trimethylpentanediol, tricyclodecanedimethanol, ethylene glycol, 2-methylpropanediol, butanediol, 1,6-hexanediol, and mixtures thereof, and
        said 2,2-dialkyl-1,3-propanediol is the mixture of 2-butyl-2-ethyl-1,3-propanediol and neopentyl glycol, and the 2-butyl-2-ethyl-1,3-propanediol is present in an amount of 10–55 mol % of the total alcohol component; and
    (c) a polyfunctional component having a functionality of three or higher, present in an amount of 5 mol % or less, based on the total moles of acid and alcohol components, wherein said polyfunctional component comprises polyacid, polyol, or mixtures thereof.

2. The copolyester resin of claim 1, wherein the sum of the mixture of 2-butyl-2-ethyl-1,3-propanediol and neopentyl glycol comprises 80–100 mol % of the total alcohol component, wherein said 2-butyl-2-ethyl-1,3-propanediol is present in an amount of 20–55 mol % of the total alcohol component.

3. The copolyester resin of claim 1, wherein said cyclohexanedimethanol is selected from the group consisting of 1,2-cyclohexanedimethanol, 1,3-cyclohexanedimethanol, 1,4-cyclohexanedimethanol, and mixtures thereof, wherein said cyclohexanedimethanol is present in an amount less than or equal to 40 mol % based on the total mole of the component (b).

4. The copolyester resin of claim 1, wherein said polyvalent alcohol is selected from the group consisting of ethylene glycol, butanediol, 1,6-hexanediol, and mixtures thereof, wherein said polyvalent alcohol is present in an amount less than or equal to 20 mol % of the total alcohol component.

5. The copolyester resin of claim 1, wherein polyfunctional component (c) is selected from the group consisting of trimethylolpropane, trimellitic acid, trimellitic anhydride, and mixtures thereof.

6. The copolyester resin of claim 1, wherein said copolyester has an acid value of 0–3 mg KOH/g, a hydroxyl value of 20–50 mg KOH/g, an intrinsic viscosity of 0.2 dl/g or higher, and a number average molecular weight of 5,000–20,000.

7. A solventborne coating composition comprising the copolyester of any of claims 1, 2, or 3 to 6 and a crosslinking agent.

8. The solventborne coating composition according to claim 7, wherein the crosslinking agent is selected from the group consisting of aminoformaldehydes, urea, and blocked polyisocyanates resins.

9. The solventborne coating composition according to claim 7, further comprising a crosslinking catalyst and a pigment.

10. A coating produced by the solventborne coating composition according to claim 7.

* * * * *